US009749946B2

(12) United States Patent
Wang et al.

(10) Patent No.: US 9,749,946 B2
(45) Date of Patent: Aug. 29, 2017

(54) METHOD AND APPARATUS FOR IMPROVED RESELECTION DURING MODE TRANSITIONS

(71) Applicant: QUALCOMM Incorporated, San Diego, CA (US)

(72) Inventors: Fan Wang, Sunnyvale, CA (US); Sundaresan Tambaram Kailasam, San Diego, CA (US); An-Swol Clement Hu, Belmont, CA (US); Uzma Khan Qazi, San Marcos, CA (US)

(73) Assignee: Qualcomm Incorporated, San Diego, CA (US)

( * ) Notice: Subject to any disclaimer, the term of this patent is extended or adjusted under 35 U.S.C. 154(b) by 76 days.

(21) Appl. No.: 14/048,953

(22) Filed: Oct. 8, 2013

(65) Prior Publication Data

US 2014/0256327 A1    Sep. 11, 2014

Related U.S. Application Data

(60) Provisional application No. 61/775,991, filed on Mar. 11, 2013.

(51) Int. Cl.
*H04W 48/20* (2009.01)
*H04W 36/00* (2009.01)
*H04W 48/16* (2009.01)

(52) U.S. Cl.
CPC ....... *H04W 48/20* (2013.01); *H04W 36/0088* (2013.01); *H04W 36/0083* (2013.01); *H04W 48/16* (2013.01)

(58) Field of Classification Search
CPC ......... H04W 36/0083–36/0094; H04W 36/04; H04W 36/08; H04W 36/30; H04W 36/32;
(Continued)

(56) References Cited

U.S. PATENT DOCUMENTS 8,504,017 B1 *  8/2013  Hietalahti ............. H04W 48/18
                                             455/426.1
8,554,212 B1 * 10/2013  Rai et al. ...................... 455/434
(Continued)

FOREIGN PATENT DOCUMENTS

GB          2 484 011 A       3/2012

OTHER PUBLICATIONS

International Search Report dated Jul. 9, 2014 issued in International Application No. PCT/US2014/020739 (17 pages).
(Continued)

*Primary Examiner* — George Eng
*Assistant Examiner* — Umair Ahsan
(74) *Attorney, Agent, or Firm* — Arent Fow, LLP

(57) ABSTRACT

The present disclosure presents a method and apparatus for improved reselection during mode transitions at a user equipment (UE). For example, the disclosure presents a method for identifying that a user equipment (UE) has started switching from a first priority scheduling mode to a second priority scheduling mode while making measurements for reselection. In addition, such an example method, may include initiating a mode transition timer in response to the identification and triggering a search for one or more frequencies of the second priority scheduling mode upon expiration of the mode transition timer. As such, an improved reselection during mode transitions at UE may be achieved.

12 Claims, 12 Drawing Sheets

(58) Field of Classification Search
CPC ..... H04W 36/34; H04W 36/36; H04W 48/18; H04W 48/20; H04W 52/0216; H04W 60/02; H04W 60/04
USPC ..... 455/422.1, 434–437, 440–441, 443, 455, 455/550.1, 553.1, 67.11; 370/329–332; 40/422.1, 434–437, 440–441, 443, 455, 40/550.1, 553.1, 67.11
See application file for complete search history.

(56) References Cited

U.S. PATENT DOCUMENTS

| | | | |
|---|---|---|---|
| 2004/0224684 A1* | 11/2004 | Dorsey | H04W 48/16 455/434 |
| 2005/0096053 A1* | 5/2005 | Liu et al. | 455/439 |
| 2008/0200169 A1* | 8/2008 | Gao | H04W 48/16 455/434 |
| 2008/0220784 A1* | 9/2008 | Somasundaram et al. | 455/437 |
| 2010/0240367 A1* | 9/2010 | Lee | H04W 36/0077 455/435.2 |
| 2012/0052864 A1 | 3/2012 | Swaminathan et al. | |
| 2012/0202480 A1* | 8/2012 | Franklin | H04W 24/10 455/423 |
| 2012/0252455 A1* | 10/2012 | Martin et al. | 455/436 |
| 2012/0302241 A1 | 11/2012 | Klingenbrunn et al. | |
| 2012/0320879 A1* | 12/2012 | Martin et al. | 370/332 |
| 2013/0109377 A1* | 5/2013 | Al-Khudairi et al. | 455/432.1 |
| 2013/0130684 A1 | 5/2013 | Gomes et al. | |
| 2013/0267221 A1* | 10/2013 | Srinivasan et al. | 455/422.1 |
| 2014/0220975 A1* | 8/2014 | Makharia et al. | 455/436 |
| 2015/0139053 A1* | 5/2015 | Van Lieshout | H04W 52/0216 370/311 |

OTHER PUBLICATIONS

3$^{rd}$ Generation Partnership Project, 3GPP: "Technical Specification Group Radio Access Network; Requirements for support of radio resource management (FDD) (Release 10)", 3GP Standard; 3GPP TS 25.133, col. RAN WG4, No. V10.8.0, Jan. 7, 2013 (Jan. 7, 2013), pp. 20-28, XP002725887, Mobile Competence Centre; 650, route des Lucioles; F-06921 Sophia-Antipolis Cedez; France paragraph [4.2.2.5.2].

3GPF TR 25.922 V6.3.0, "Radio resource management strategies (Release 6)," Technical Specification Group Radio Access Network, Mar. 2006, 88 pages.

3GPP TS 25.304 V8.6.0, "User Equipment (UE) procedures in idle mode and procedures for cell reselection in connected mode (Release 8)," Technical Specification Group Radio Access Network, Jun. 2009, 49 pages.

Ericsson, "Introduction to LTE Cell Reselection," Ericsson WCDMA Radio Access Network, Jul. 4, 2011, 26 pages.

3GPP TS 25.133 V10.0.0 (Dec. 2012); 3rd Generation Partnership Project; Technical Specification Group Radio Access Network; Requirements for support of radio resource management; (FDD), Dec. 2012, Release 10.

* cited by examiner

METHOD AND APPARATUS FOR IMPROVED RESELECTION DURING MODE TRANSITIONS

CLAIM OF PRIORITY UNDER 35 U.S.C. §119

The present application for patent claims priority to U.S. Provisional Patent Application No. 61/775,991, filed Mar. 11, 2013, entitled "Method and Apparatus for Cell Reselection During Mode Transitions," which is assigned to the assignee hereof, and hereby expressly incorporated by reference herein.

BACKGROUND

Field

Aspects of the present disclosure relate generally to wireless communication systems, and more particularly, to cell reselection.

Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As LTE networks largely overlap with W-CDMA networks, W-CDMA to LTE reselection speed is a concern for network operators. When a suitable LTE cell becomes available, it is preferable for a user equipment (UE) to reselect to a LTE cell as soon as the reselection conditions are met. However, the reselection to a LTE cell requires UE to first detect LTE cells. After detection of LTE cells, signal measurements such as reference signal received power (RSRP) and reference signal received quality (RSRQ) are performed. If RSRP and/or RSRQ criteria are met, the UE may trigger reselection to a LTE cell.

However, while performing signal measurements, a UE may transition from one priority scheduling mode to another priority scheduling mode, for example, from an all priority scheduling mode to a high priority scheduling mode or from a high priority scheduling mode to an all priority scheduling mode. The transition may be triggered due to changes in the UE's serving cell channel conditions.

In a high priority scheduling mode, a UE can generally set up a high priority detection timer according to $3^{rd}$ generation partnership project (3GPP) Specifications. The high priority detection timer counts down as time goes by and the UE issues a search for a cell when the timer goes to zero, and resets the timer. A similar approach can be used in all priority scheduling mode. However, the 3GPP Specifications do not describe cell detection during mode transitions. If these current approaches are used, a mode transition may delay the cell detection process and, as a result, delay cell reselection.

Therefore, there is a desire for improved reselection during mode transitions at a user equipment.

SUMMARY

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents an example method and apparatus for improved cell reselection during mode transitions at a user equipment (UE). For example, the present disclosure presents an example method for improved reselection during mode transitions at a user equipment (UE) that includes identifying that a user equipment (UE) has started switching from a first priority scheduling mode to a second priority scheduling mode while making measurements for reselection, in addition, such method may include initiating a mode transition timer in response to the identification and triggering a search for one or more frequencies of the second priority scheduling mode upon expiration of the mode transition timer.

In an additional aspect, an apparatus for improved reselection during mode transitions at a user equipment is disclosed. The apparatus may include means for identifying that a user equipment (UE) has started switching from a first priority scheduling mode to a second priority scheduling mode while making measurements for reselection, means for initiating a mode transition timer in response to the identification, and means for triggering a search for one or more frequencies of the second priority scheduling mode upon expiration of the mode transition timer.

In a further aspect, a computer program product for improved reselection during mode transitions is described. The computer program product may include a computer-readable medium comprising code executable by a computer for identifying that a user equipment (UE) has started switching from a first priority scheduling mode to a second priority scheduling mode while making measurements for reselection, initiating a mode transition timer in response to the identification and triggering a search for one or more frequencies of the second priority scheduling mode upon expiration of the mode transition timer.

Moreover, the present disclosure presents an apparatus for improve reselection during mode transitions. The apparatus may include a mode switching component to identify that a user equipment (UE) has started switching from a first priority scheduling mode to a second priority scheduling mode while making measurements for reselection, a mode transition timer initiating component to initiate a mode transition timer in response to the identification, and a frequency search triggering component to trigger a search for one or more frequencies of the second priority scheduling mode upon expiration of the mode transition timer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides a method and apparatus for cell reselection during mode transitions. In particular, the described method and apparatus may be utilized in any cell reselection scenario when a UE switches from one priority mode to another priority mode, for example, from all priority/high priority scheduling mode to high priority/all priority scheduling mode. In an aspect, the cell reselection may also include transition from radio access network (RAT) standard to another RAT standard or with the same RAT standard. Examples of such RAT standards include CDMA, CDMA200, GSM, Ev-DO, W-CDMA, Wi-MAX, and LTE.

Figure 1:
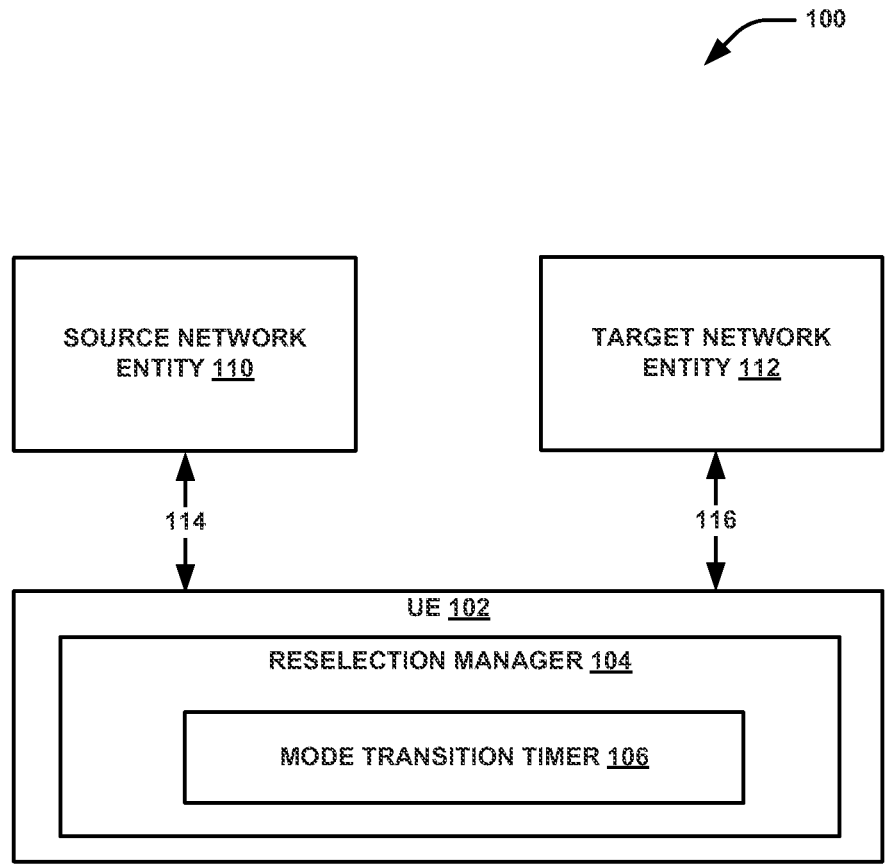
FIG. 1 is a block diagram illustrating an example wireless system in aspects of the present disclosure.

Referring to FIG. 1, a wireless communication system 100 is illustrated that facilitates improved reselection during mode transitions at a user equipment (UE). System 100 includes a UE 102 that may communicate with a source network entity 110 and a target network entity 112 via one or more over-the-air links 114 and/or 116, respectively. For example, network entities 114 and/or 116 may be a CDMA, GSM, Ev-DO, W-CDMA, Wi-Max, LTE, or LTE Advanced RAT network entity.

Additionally, source network entity 110 and target network entity 112 may include one or more of any type of network components, for example, an access point, including a base station (BS) or Node B or eNodeB or a femto cell, a relay, a peer-to-peer device, an authentication, authorization and accounting (AAA) server, a mobile switching center (MSC), etc., that can enable UE 102 to communicate and/or establish and maintain first link 114 and second link 116 to respectively communicate with source network entity 110 and target network entity 112. Furthermore, the one or more network entities 110 and/or 112 may each be associated with a radio access technology, for example, CDMA, GSM, Ev-DO, W-CDMA, Wi-Max, LTE, or LTE Advanced, etc., each of which may be a candidate for serving cell reselection or handover.

In an example aspect, source network entity 110 may be a W-CDMA network and target network entity 112 may be a LTE network. Alternatively, in an additional example aspect, source network entity 110 may be a LTE network and target network entity 112 may be a W-CDMA network. In another example aspect, source network entity 110 may be a W-CDMA network and target network entity 112 may be a W-CDMA network. Alternatively, in an additional example aspect, source network entity 110 may be a LTE network and target network entity 112 may be a LIE network.

In an aspect, UE 102 may be in an idle state in the coverage of a serving cell, for example, a serving cell located in source network entity 110. For example, the UE may be in an idle state or CELL_FACH, CELL_PCH, or other 3GPP-defined UE state. UE 102 may seek to reselect from source network entity 110 to target network entity 112.

Furthermore, UE 102 may include a reselection manager 104, which may be configured to improve cell reselection during mode transitions at UE 102. In an additional aspect, reselection manager 104 may be further configured to include a mode transition timer 106, a mode switching component 202, a mode transition timer initiating component 204, and/or a frequency search triggering component 206. In an optional aspect, reselection manager 104 may be further configured to include a reselection component 209.

In an aspect, reselection manager 104 and/or one or more of the components described above may be configured to identify that a user equipment (UE) has started switching from a first priority scheduling mode to a second priority scheduling mode, initiate a mode transition timer in response to the identification, and trigger a search for one or more frequencies of the second priority scheduling mode upon expiration of the mode transition timer.

In an additional aspect, UE 102 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, source network entity 110 and/or target network entity 112 of system 100 may include one or more of any type of network component, for example, an access point, including a base station (BS) or a Node B, an eNode B, femto cell, a pico cell, a relay, a peer-to-peer device, an authentication, authorization and accounting (AAA) server, a mobile switching center (MSC), a radio network controller (RNC), etc.

Figure 2:
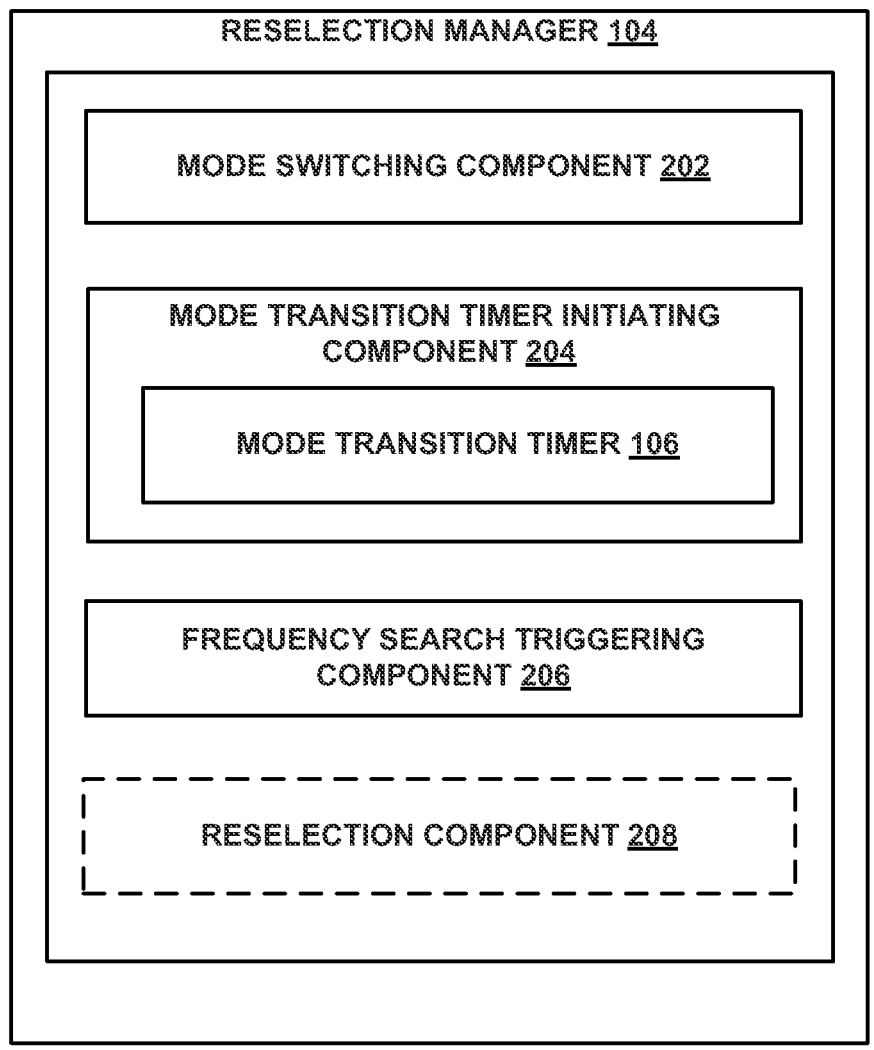
FIG. 2 is a block diagram illustrating an example reselection manager in aspects of the present disclosure.

Referring to FIG. 2, illustrated are reselection manager 104 and various sub-components that may comprise reselection manager 104. In an aspect, the reselection from a first radio access technology (RAT) to a second RAT, for example, from W-CDMA to LTE requires UE to first detect cells of the second RAT, for example, LTE cells. In an aspect, a layer may be considered as a higher priority layer or an all priority layer relative to the serving cell or frequency.

In an example aspect, UE 102 may detect cells in the second RAT, for example, LTE cells (cells may also be referred to as layers, frequencies, etc. in the disclosure) as described below, based on, for example, 3GPP Specification 25.133, Section 4.2.3.5. For example, LTE layers in a high priority scheduling mode (for example, SrxlevServingCell>Sprioritysearch1 and SqualServingCell>Sprioritysearch2) may be detected by searching for high priority LTE layers at least every "Thigher_priority_search=60*Nlayers," where Nlayers may be defined as the total number of configured higher priority layers. For example, if there are two layers configured as higher priority layers, the search is performed every 120 seconds (60×2).

In an example aspect, UE 102 may detect cells in the second RAT, for example, LTE cells as described below based on 3GPP Specification 25.133, Section 4.2.3.5. For example, LTE layers in an all priority scheduling mode (for example, SrxlevServingCell<=Sprioritysearch1 or SqualServingCell<=Sprioritysearch2) may be detected by searching for all priority layers (for example, both high priority and lower priority layers) every "Kcarrier*TdetectE-UTRA,", where the values of TdetectE-UTRA are shown in the Table 1 below and Kcarrier is the number of E-UTRA or LTE frequencies indicated in the inter-RAT measurement control system information.

TABLE 1

$T_{detect}$, $T_{measure}$ and $T_{evaluate}$ for E-UTRA Cells
(This table is reproduced from TS 25.133 Table 4.2)

| DRX cycle length [s] | $T_{detectE-UTRA}$ [s] | $T_{measureE-UTRA}$ [s] (number of DRX cycles) | $T_{evaluateEUTRA}$ [s] (number of DRX cycles) |
|---|---|---|---|
| 0.08 | 30 | 2.56 (32) | 7.68 (96) |
| 0.16 |   | 2.56 (16) | 7.68 (48) |
| 0.32 |   | 5.12 (16) | 15.36 (48) |
| 0.64 |   | 5.12 (8) | 15.36 (24) |
| 1.28 |   | 6.4 (5) | 19.2 (15) |
| 2.56 | 60 | 7.68 (3) | 23.04 (9) |
| 5.12 |   | 10.24 (2) | 30.72 (6) |

Reselection manager 104 may include a mode switching component 202, which may be configured to identify that a user equipment (UE) has started switching from a first priority scheduling mode to a second priority scheduling mode, for example identify that the UE is transitioning between scheduling modes, for example, from an all priority scheduling mode to a high priority scheduling mode, or from a high priority scheduling mode to an all priority scheduling mode. In an aspect, the mode transitions may be triggered due to various reasons, for example, changes in serving cell channel conditions of UE 102. In an example aspect, the UE may transition from all priority scheduling mode to high priority scheduling mode if the serving cell channel condition of the UE improves due to better signal reception or UE mobility (e.g., moving towards the centre of the cell or to a location with better coverage). In another example aspect, the UE may transition from high priority scheduling mode to all priority scheduling mode due to serving channel fading or UE mobility (e.g., moving towards the edge of the cell or to a location with poor coverage).

For example, in an aspect, if SqualServingCell>Sprioritysearch2, but SrxlevServingCell deteriorates from above the value of Sprioritysearch1 to below the below of Sprioritysearch1, which may have been caused by various reasons as described above, UE 102 may transition from a high priority scheduling mode to an all priority scheduling mode. In an alternative example aspect, if SqualServingCell>Sprioritysearch2, but SrxlevServingCell improves from below the value of Sprioritysearch1 to above the value of Sprioritysearch1, which may have been caused by various reasons as described above, UE 102 may transition from an all priority scheduling mode to a high priority scheduling mode. Since 3GPP Specifications do not clearly describe cell detection during mode transitions, UE 102 may need a longer time to recover from mode transitions before UE 102 returns to a normal state to continue searching for cells.

In an aspect, UE 102 may be configured with timers associated with the scheduling modes. For example, in a high priority scheduling mode, UE 102 may set up a high priority detection timer for detection of high priority layers as per the information described above. As the timer counts down and reaches zero, the UE may issue detection of high priority layers and reset the high priority detection timer. A similar process may be used by the UE in an all priority scheduling mode with an all priority detection timer for detection of high priority layers set to a value as shown above. The high priority and all priority and detection timers are typically configured to be independent of each other.

In an aspect, reselection manager 104 may include a mode transition timer initiating component 204 which may be configured to start mode transition timer 106 in response to identifying that the UE has started switching from one priority scheduling mode to another priority scheduling mode. For example, a $T_{mode\_transition}$ timer may be initiated. The mode transition timer may be configured to a value smaller than required by 3GPP Specifications as described above. For example, $T_{mode\_transition}$ timer may be configured to a value greater than or equal to 0, and smaller than $T_{higher\_priority\_search}$ if the transition is from an all priority scheduling mode to high priority scheduling mode, or smaller than $K_{carrier}*T_{detectE-UTRA}$ if the transition is from high priority scheduling mode to an all priority scheduling mode.

As explained above, the lack of proper transition timer management during mode transition may result in longer delays between two consecutive detections of a given frequency ($T_{gap}$). For example, for all priority to high priority mode transition, the $T_{gap}$ could be up to $T_{gap}=K_{carrier}*T_{detectE-UTRA}+T_{higher\_priority\_}$search. In one scenario, for example, the value of Tgap may be up to 960 seconds, as the UE can support up to a total of eight LTE carriers, 4 frequency division duplex (FDD) and 4 time division duplex (TDD) carriers giving $K_{carrier}=8$, $T_{detectE-UTRA}=60$ secs, T $T_{higher\_priority\_search}=8*60=480$ secs.

In an additional or optional aspect, the mode transition timer (e.g., $T_{mode\_transition}$ timer) may be configured independently based on whether the transition is, for example, from an all priority scheduling mode to a high priority scheduling mode or from a high priority scheduling mode to an all priority scheduling mode.

Furthermore, reselection manager 104 may include a frequency search triggering component 206. In an aspect, frequency searching triggering component 206 may be configured to search for a cell (for example, a frequency) in the second mode after the expiration of the mode transition timer. In an aspect, frequency searching triggering component 206 may be configured to search for high priority or all priority frequencies depending on whether the UE is transitioning from an all priority scheduling mode to a high priority scheduling mode or from a high priority scheduling mode to an all priority scheduling mode.

In a additional or optional aspect, reselection manager 104 may include a reselection component 208. Reselection component 208 triggers a reselection to a newly selected cell to become the serving cell. For example, the newly selected serving cell may be a cell in target network entity 112.

Figure 3:
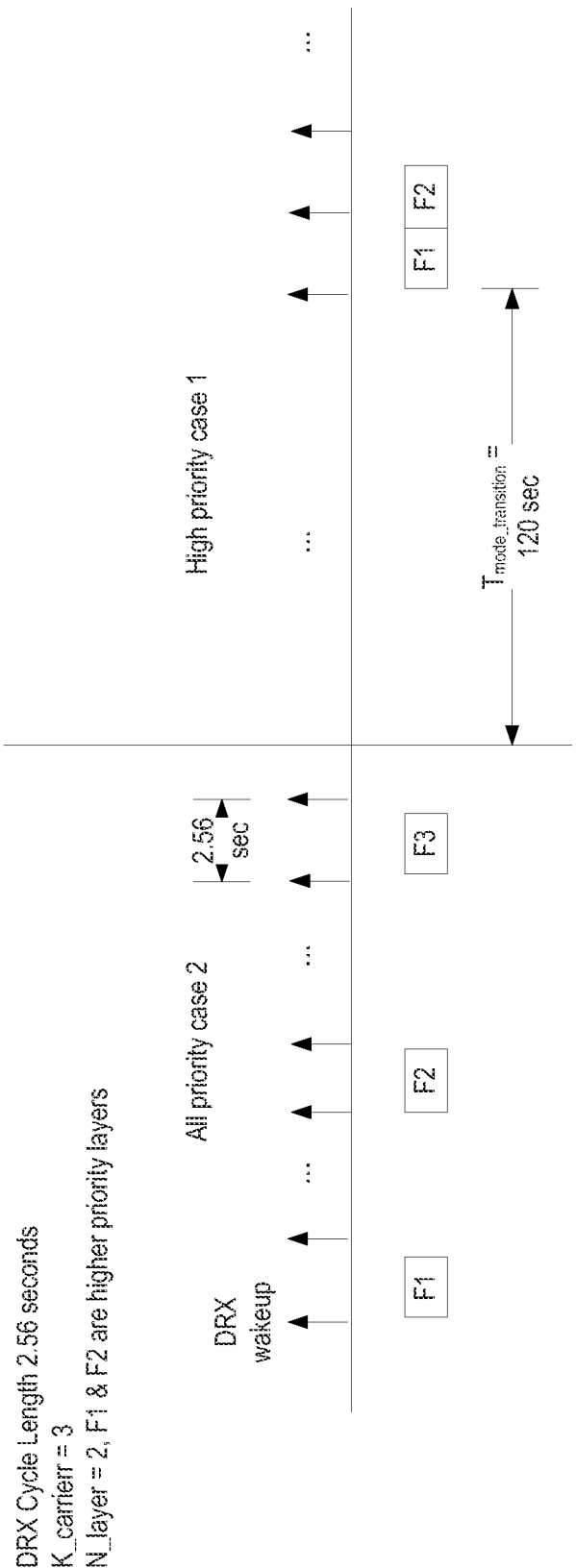
FIG. 3 is a diagram illustrating an example of mode transition.

Referring to FIG. 3, illustrated are delays associated with cell reselection during mode transitions. In an example, FIG. 3 shows delays associated with detection of layers when the UE transitions from all priority scheduling mode to a high priority scheduling mode. In the example in FIG. 3, the UE is configured with a total of three layers, out of which two of them are higher priority layers. The search for detecting layers may be performed in one or multiple discontinuous reception (DRX) cycles. For example, the search for the detection of cells of layers may be spread out in all DRX cycles. In the example of FIG. 3, the search is spread out across multiple DRX cycles. As shown in FIG. 3, the $T_{mode\text{-}transition} = T_{higher\ priority\ search}$ timer is configured to a value of 120 seconds, as the UE is configured with higher priority layers and the UE is transitioning from an all priority scheduling mode to a high priority scheduling mode.

Figure 4:
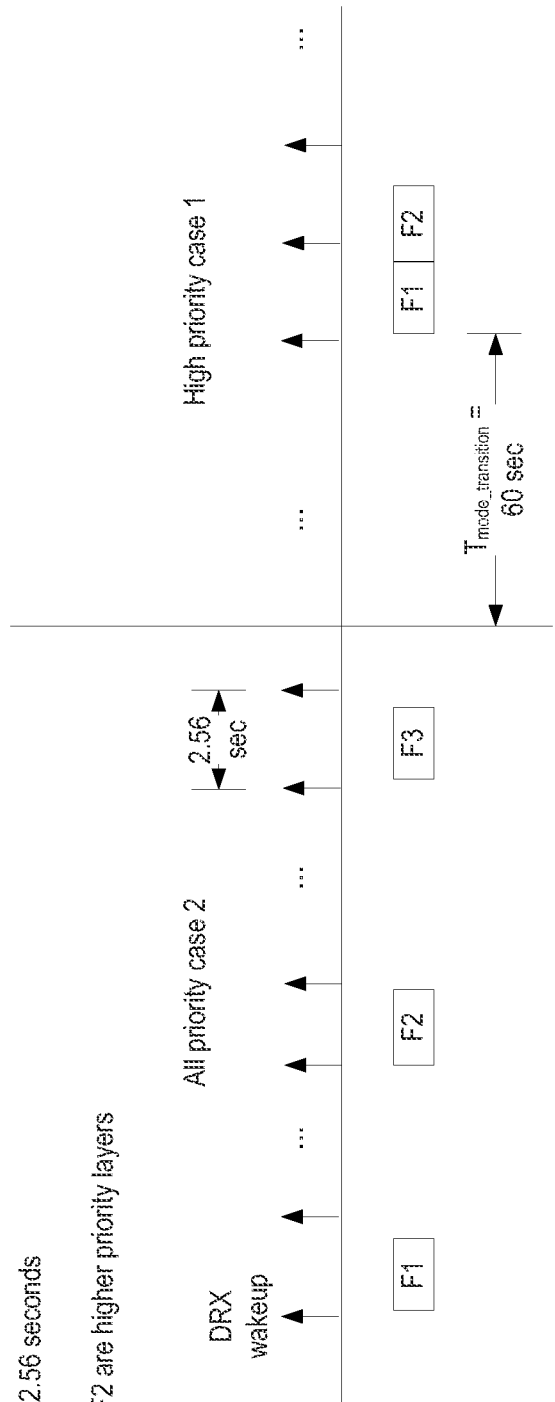
FIG. 4 is a diagram illustrating an example of mode transition in aspects of the present disclosure.

Referring to FIG. 4, illustrated is an example aspect with $T_{mode\text{-}transition}$ timer configured to a value to improve reselection during mode transitions. As described in FIG. 3, the $T_{mode\text{-}transition}$ timer is generally configured to a value of 120 seconds based on 3GPP Specifications. In an example aspect, the $T_{mode\text{-}transition}$ timer is configured to a value of 60 seconds to improve reselection during mode transitions.

In an aspect, the $T_{mode\text{-}transition}$ timer may be configured to any value between zero and 120 seconds since the UE is transitioning from an all priority scheduling mode to a high priority scheduling mode and the UE is configured to higher priority layers. However, the value of $T_{mode\text{-}transition}$ timer is configured to a value to reduce the delays associated with mode transitions without using too much batter power. If the $T_{mode\text{-}transition}$ timer is configured to a lower value, search for layers or cells may conflict with each other and may result in power inefficiencies.

Figure 5:
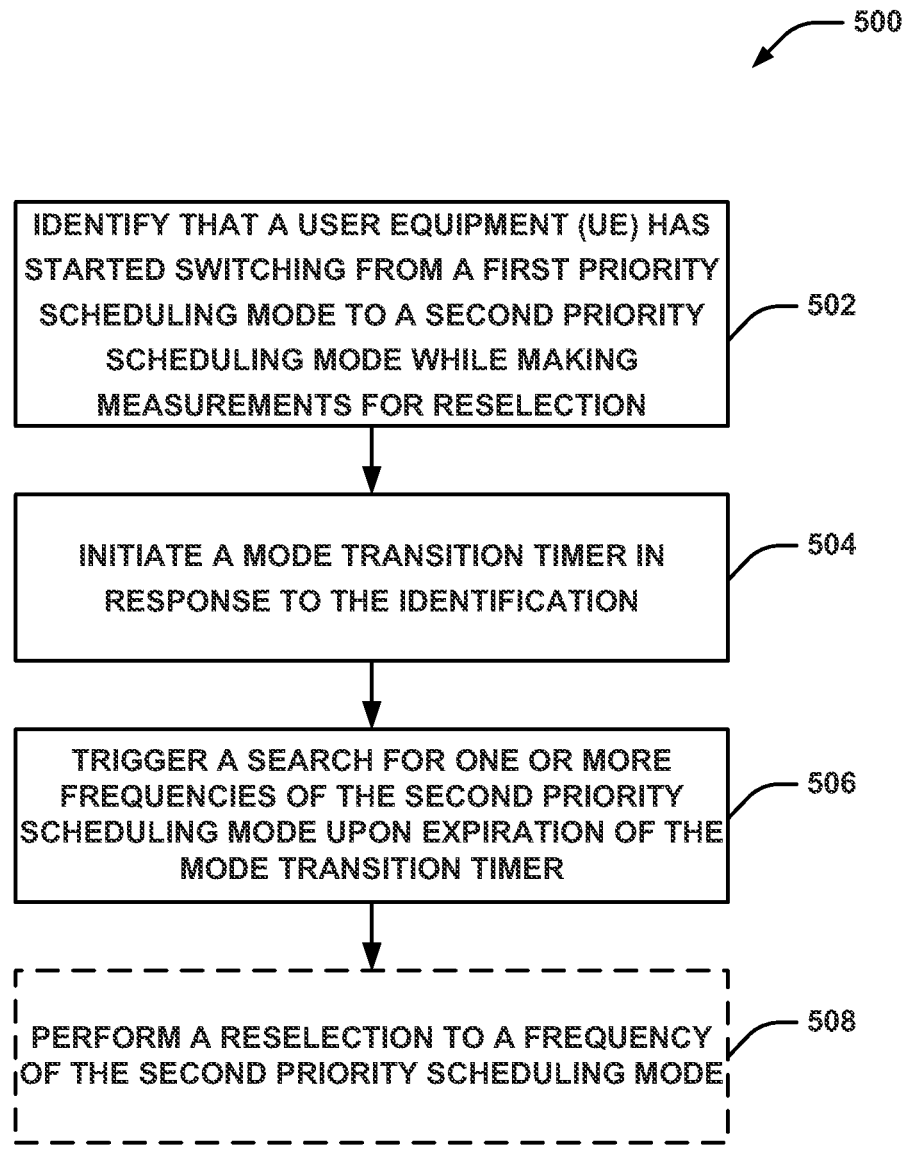
FIG. 5 is a flow diagram illustrating aspects of a method for improving mode transitions.

FIG. 5 illustrates an example methodology 500 for improved cell reselection during mode transitions. In an aspect, at block 502, methodology 500 may include identifying that a user equipment (UE) has started switching from a first priority scheduling mode to a second priority scheduling mode while making measurements for reselection. For example, in an aspect, UE 102, reselection manager 104, and/or mode switching component 202 may be configured to identify that UE 102 has started switching from an all priority scheduling mode to a high priority scheduling mode or from a high priority scheduling mode to an all priority scheduling mode.

Additionally, at block 504, methodology 500 may include initiating a mode transition timer in response to the identification. For example, in an aspect, UE 102, reselection manager 104, and/or mode transition timer initiating 204 may initiate a mode transition timer 106 in response to identifying that the UE has started switching from a first priority scheduling mode to a second priority scheduling mode.

Further, at block 506, methodology 500 may include triggering a search for one or more frequencies of the second priority scheduling mode upon expiration of the mode transition timer. For example, in an aspect, UE 102, reselection manager 104, and/or frequency search triggering component 206 may trigger a search for frequencies of the second priority scheduling mode upon expiration of the mode transition timer 106.

Optionally, at block 508, methodology 500 may include triggering reselection to a second cell in the second priority scheduling mode. For example, in an aspect, UE 102, reselection manager 104, and/or reselection component 208 may trigger reselection to the cell in the second priority scheduling mode.

Figure 6:
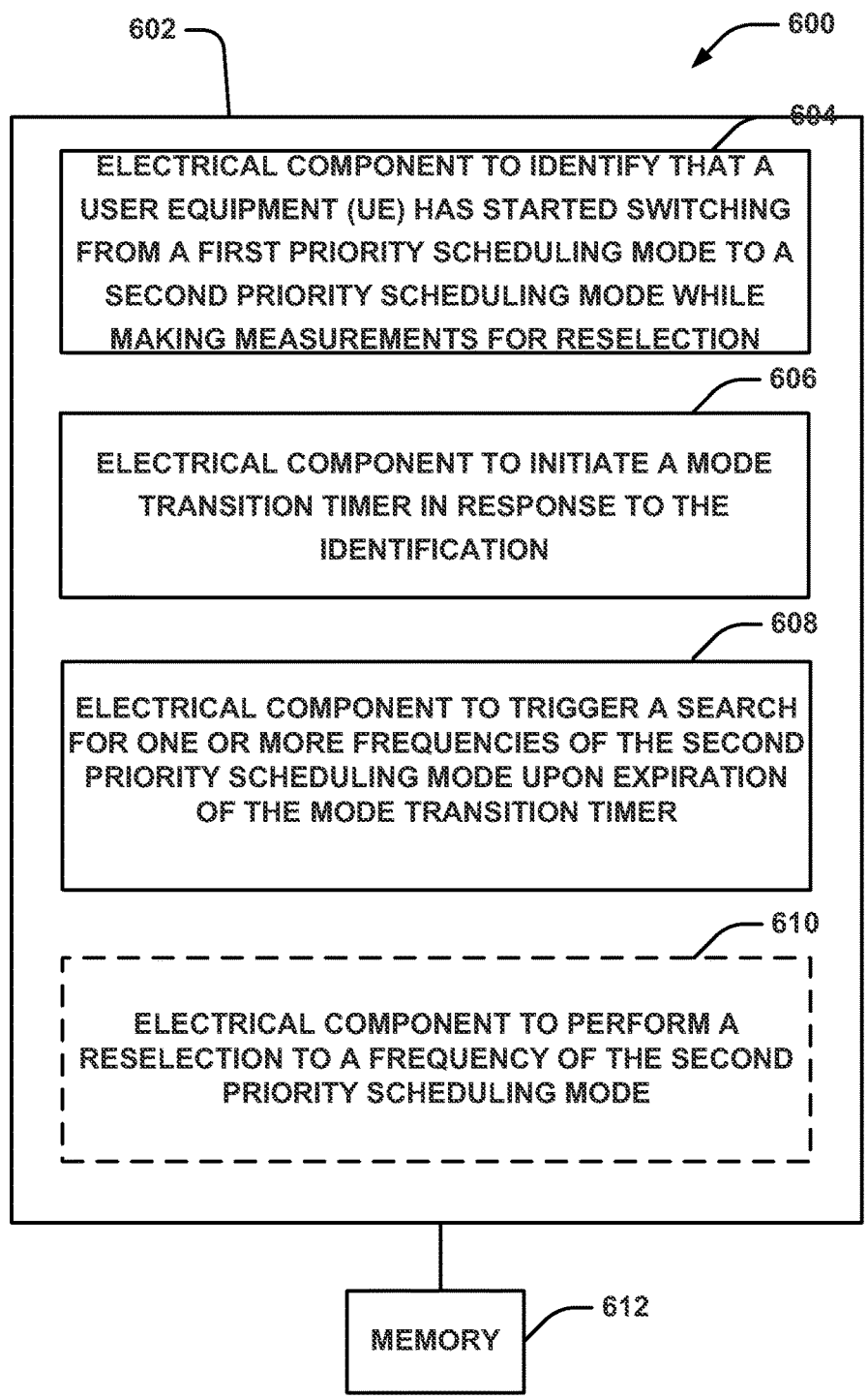
FIG. 6 is a block diagram illustrating aspects of a logical grouping of electrical components as contemplated by the present disclosure.

Referring to FIG. 6, an example system 600 is displayed for improved reselection during mode transitions. For example, system 600 can reside at least partially within UE 102 (FIG. 1). It is to be appreciated that system 600 is represented as including functional blocks, which can be functional blocks that represent functions implemented by a processor, software, or combination thereof (for example, firmware). System 600 includes a logical grouping 602 of electrical components that can act in conjunction. For instance, logical grouping 602 can include an electrical component 604 for identifying that a user equipment (UE) has started switching from a first priority scheduling mode to a second priority scheduling mode while making measurements for reselection. In an aspect, electrical component 604 may comprise mode switching component 202 (FIG. 2).

Additionally, logical grouping 602 can include an electrical component 606 for initiating a mode transition timer in response to the identification. In an aspect, electrical component 606 may comprise mode transition timer initiating component 204 (FIG. 2). In an additional aspect, logical grouping 602 can include an electrical component 608 for triggering a search for one or more frequencies of the second priority scheduling mode upon expiration of the mode transition timer. In an aspect, electrical component 608 may comprise frequency search triggering component 206 (FIG. 2). Optionally, in an aspect, logical grouping 602 can include an electrical component 610 for performing a reselection to a frequency of the second priority scheduling mode. In an aspect, electrical component 610 may comprise reselection component 208 (FIG. 2).

Additionally, system 600 can include a memory 612 that retains instructions for executing functions associated with the electrical components 604, 606, 608 and 610, stores data used or obtained by the electrical components 604, 606, 608 and 610, etc. While shown as being external to memory 612, it is to be understood that one or more of the electrical components 604, 606, 608 and 610 can exist within memory 612. In one example, electrical components 604, 606, 608 and 610 can comprise at least one processor, or each electrical component 604, 606, 608 and 610 can be a corresponding module of at least one processor. Moreover, in an additional or alternative example, electrical components 604, 606, 608 and 610 can be a computer program product including a computer readable medium, where each electrical component 604, 606, 608 and 610 can be corresponding code.

Figure 7:
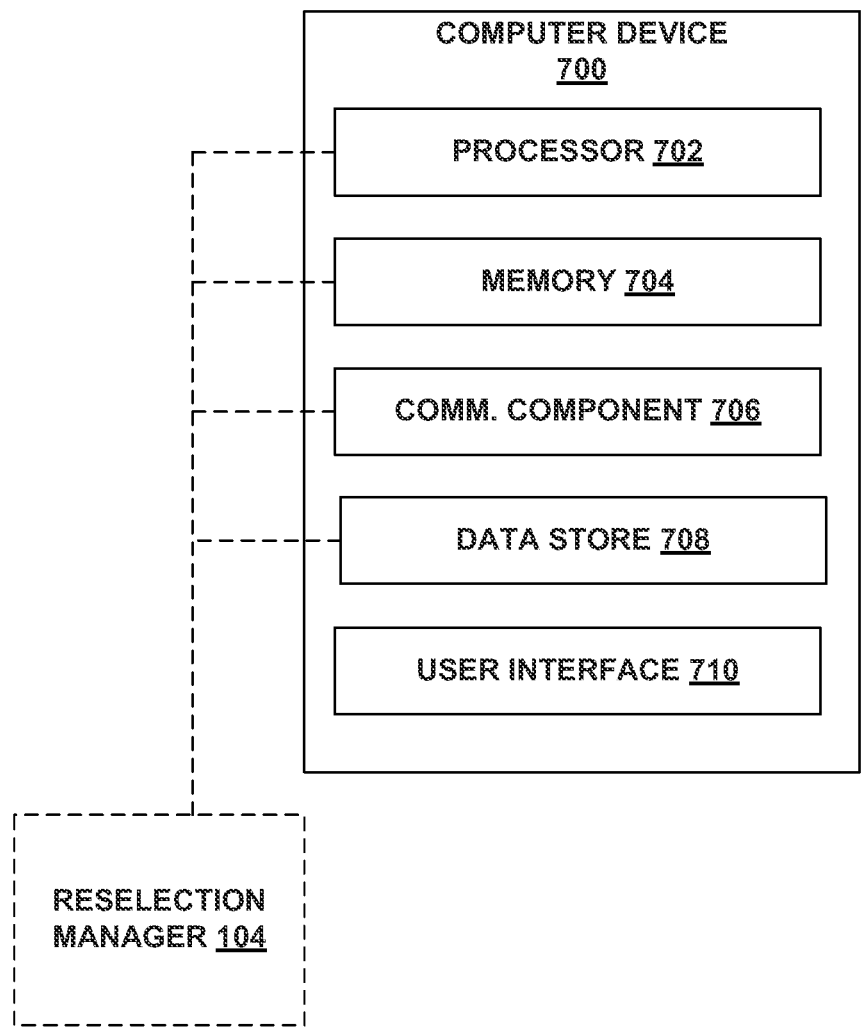
FIG. 7 is a block diagram illustrating aspects of a computer device according to the present disclosure.

Referring to FIG. 7, in one aspect, UE 102, for example, including reselection manager 104, or the one or more network entities of FIG. 1, for example, source network entity 110 and/or target network entity 112, may be represented by a specially programmed or configured computer device 700. For example, the special programming or configuring of computer device 700 may be programming or configuring to perform that respective functions described herein for the respective entity, such as for UE 102, source network entity 110, and/or target network entity 112.

Computer device 700 includes a processor 702 specially configured to carry out processing functions associated with one or more of components and functions described herein. Processor 702 can include a single or multiple set of processors or multi-core processors. Moreover, processor 702 can be implemented as an integrated processing system and/or a distributed processing system.

Computer device 702 further includes a memory 704, such as for storing data used herein and/or local versions of applications and/or instructions or code being executed by processor 702, such as to perform the respective functions of the respective entities described herein. Memory 704 can include any type of memory usable by a computer, such as random access memory (RAM), read only memory (ROM), tapes, magnetic discs, optical discs, volatile memory, non-volatile memory, and any combination thereof.

Further, computer device 700 includes a communications component 706 that provides for establishing and maintaining communications with one or more parties utilizing hardware, software, and services as described herein. Communications component 706 may carry communications between components on computer device 700, as well as between computer device 700 and external devices, such as devices located across a communications network and/or devices serially or locally connected to computer device 700. For example, communications component 706 may include one or more buses, and may further include transmit chain components and receive chain components associated with a transmitter and receiver, respectively, or a transceiver, operable for interfacing with external devices.

Additionally, computer device 700 may further include a data store 708, which can be any suitable combination of hardware and/or software, that provides for mass storage of information, databases, and programs employed in connection with aspects described herein. For example, data store 708 may be a data repository for applications not currently being executed by processor 702.

Computer device 700 may additionally include a user interface component 710 operable to receive inputs from a user of computer device 700, and further operable to generate outputs for presentation to the user. User interface component 710 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Figure 8:
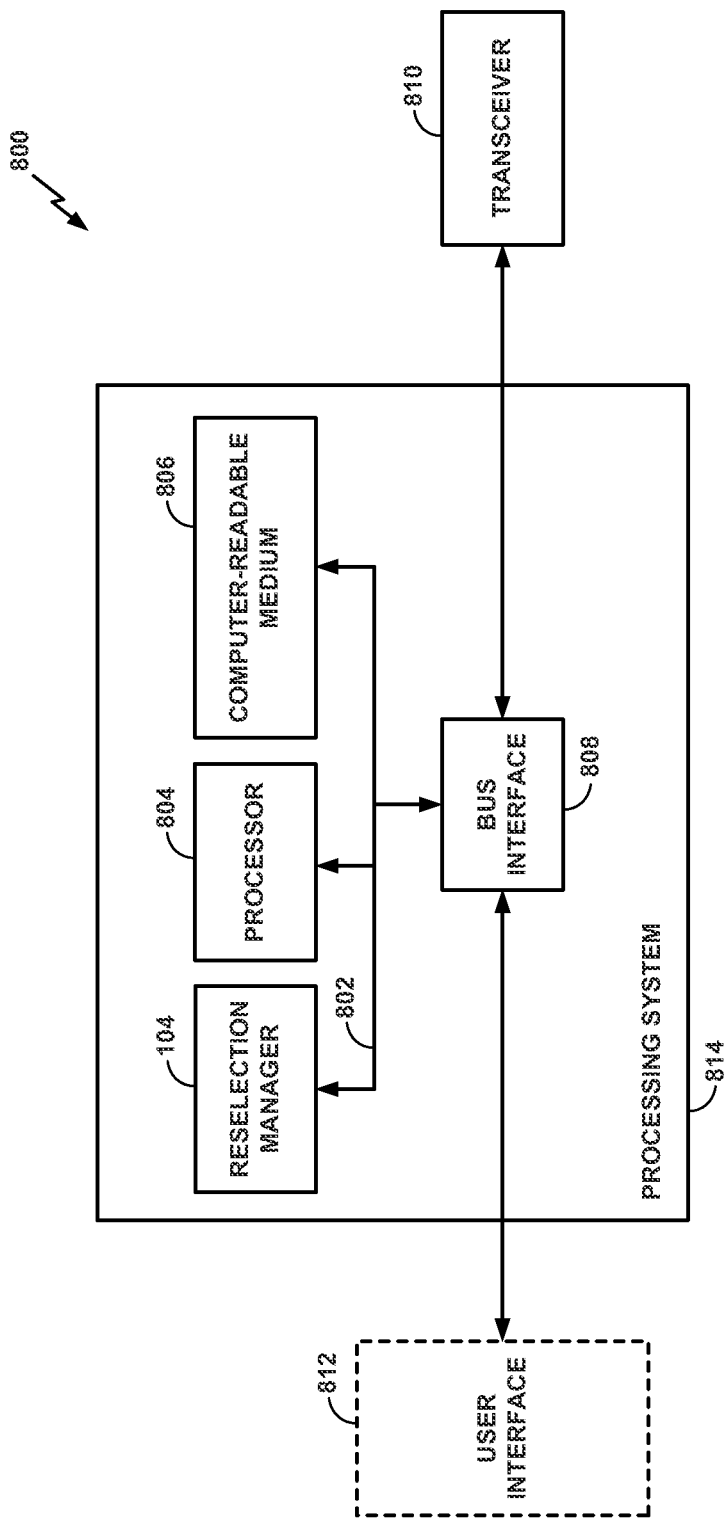
FIG. 8 is a block diagram illustrating an example of a hardware implementation for an apparatus employing a processing system.

FIG. 8 is a block diagram illustrating an example of a hardware implementation for an apparatus 800 employing a processing system 814 for carrying out aspects of the present disclosure, such as methods for improved reselection during mode transitions. In this example, the processing system 814 may be implemented with a bus architecture, represented generally by a bus 802. The bus 802 may include any number of interconnecting buses and bridges depending on the specific application of the processing system 814 and the overall design constraints. The bus 802 links together various circuits including one or more processors, represented generally by the processor 804, computer-readable media, represented generally by the computer-readable medium 806, and one or more components described herein, such as, but not limited to, reselection manager 104 (FIGS. 1 and 2). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium. Depending upon the nature of the apparatus, a user interface 812 (e.g., keypad, display, speaker, microphone, joystick) may also be provided.

The processor 804 is responsible for managing the bus 802 and general processing, including the execution of software stored on the computer-readable medium 808. The software, when executed by the processor 804, causes the processing system 814 to perform the various functions described infra for any particular apparatus. The computer-readable medium 806 may also be used for storing data that is manipulated by the processor 604 when executing software.

Figure 9:
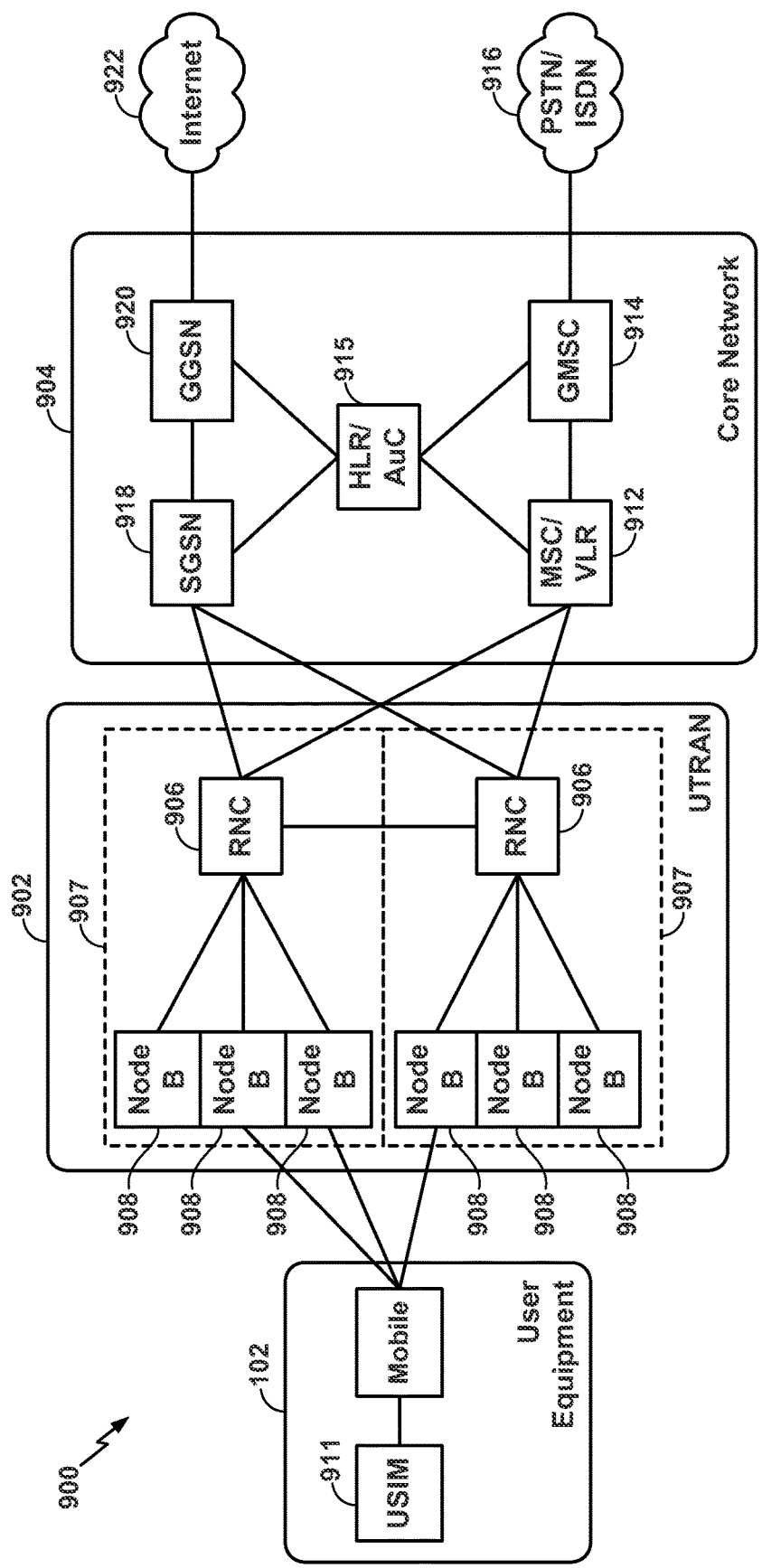
FIG. 9 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 9 are presented with reference to a UMTS system 900 employing a W-CDMA air interface, and may include a UE 102 executing an aspect of reselection manager 104 of FIG. 1. A UMTS network includes three interacting domains: a Core Network (CN) 904, a UMTS Terrestrial Radio Access Network (UTRAN) 902, and UE 104. In an aspect, as noted, UE 910 may be UE 102 (FIG. 1) and may be configured to perform functions thereof, for example, including cell reselection during mode transitions of reselection manager 104. Further, UTRAN 902 may comprises first RAT and/or second RAT network entities, such as macro cell network entity 110 and femtocell network entity 112 (FIG. 1), which in this case may be respective ones of the Node Bs 909. In this example, UTRAN 902 provides various wireless services including telephony, video, data, messaging, broadcasts, and/or other services. The UTRAN 902 may include a plurality of Radio Network Subsystems (RNSs) such as an RNS 907, each controlled by a respective Radio Network Controller (RNC) such as an RNC 906. Here, the UTRAN 902 may include any number of RNCs 906 and RNSs 908 in addition to the RNCs 906 and RNSs 907 illustrated herein. The RNC 906 is an apparatus responsible for, among other things, assigning, reconfiguring, and releasing radio resources within the RNS 907. The RNC 906 may be interconnected to other RNCs (not shown) in the UTRAN 902 through various types of interfaces such as a direct physical connection, a virtual network, or the like, using any suitable transport network.

Communication between UE 910 and Node B 908 may be considered as including a physical (PHI-Y) layer and a medium access control (MAC) layer. Further, communication between UE 910 and RNC 906 by way of a respective Node B 908 may be considered as including a radio resource control (RRC) layer. In the instant specification, the PHY layer may be considered layer 1; the MAC layer may be considered layer 9; and the RRC layer may be considered layer 3. Information herein below utilizes terminology introduced in the RRC Protocol Specification, 3GPP TS 95.331 v9.1.0, incorporated herein by reference.

The geographic region covered by the RNS 907 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 908 are shown in each RNS 907; however, the RNSs 907 may include any number of wireless Node Bs. The Node Bs 909 provide wireless access points to a CN 904 for any number of mobile apparatuses, such as UE 102 or 910, and may be macro cell network entity 110 or optional femtocell network entity 112 of FIG. 1. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus in this case is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In a UMTS system, the UE 910 may further include a universal subscriber identity module (USIM) 911, which contains a user's subscription information to a network. For illustrative purposes, one UE 910 is shown in communication with a number of the Node Bs 908. The DL, also called the forward link, refers to the communication link from a NodeB 908 to a UE 910, and the UL, also called the reverse link, refers to the communication link from a UE 910 to a NodeB 908.

The CN 904 interfaces with one or more access networks, such as the UTRAN 902. As shown, the CN 904 is a GSM core network. However, as those skilled in the art will recognize, the various concepts presented throughout this disclosure may be implemented in a RAN, or other suitable access network, to provide UEs with access to types of CNs other titan GSM networks.

The CN 904 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 904 supports circuit-switched services with a MSC 912 and a GMSC 914. In some applications, the GMSC 914 may be referred to as a media gateway (MGW). One or more RNCs, such as the RNC 906, may be connected to the MSC 912. The MSC 912 is an apparatus that controls call setup, call routing, and UE mobility functions. The MSC 912 also includes a VLR that contains subscriber-related information for the duration that a UE is in the coverage area of the MSC 912. The GMSC 914 provides a gateway through the MSC 912 for the UE to access a circuit-switched network 916. The GMSC 914 includes a home location register (HLR) 915 containing subscriber data, such as the data reflecting the details of the services to which a particular user has subscribed. The HLR is also associated with an authentication center (AuC) that contains subscriber-specific authentication data. When a call is received for a particular UE, the GMSC 914 queries the HLR 915 to determine the UE's location and forwards the call to the particular MSC serving that location.

The CN 904 also supports packet-data services with a serving GPRS support node (SGSN) 918 and a gateway GPRS support node (GGSN) 920. GPRS, which stands for General Packet Radio Service, is designed to provide packet-data services at speeds higher than those available with standard circuit-switched data services. The GGSN 920 provides a connection for the UTRAN 902 to a packet-based network 922. The packet-based network 922 may be the Internet, a private data network, or some other suitable packet-based network. The primary function of the GGSN 920 is to provide the UEs 910 with packet-based network connectivity. Data packets may be transferred between the GGSN 920 and the UEs 910 through the SGSN 918, which performs primarily the same functions in the packet-based domain as the MSC 912 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a NodeB 908 and a UE 910. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 910 provides feedback to Node B 909 over the HS-DPCCH to indicate whether it correctly decoded a packet on the downlink.

HS-DPCCH further includes feedback signaling from the UE 910 to assist the Node B 908 in taking the right decision in terms of modulation and coding scheme and precoding weight selection, this feedback signaling including the CQI and PCI.

HSPA Evolved or HSPA is an evolution of the HSPA standard that includes MIMO and 64-QAM, enabling increased throughput and higher performance. That is, in an aspect of the disclosure, the Node B 908 and/or the UE 910 may have multiple antennas supporting MIMO technology. The use of MIMO technology enables the Node B 908 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 910 to increase the data rate or to multiple UEs 910 to increase the overall system capacity. This is achieved by spatially precoding each data stream and then transmitting each spatially precoded stream through a different transmit antenna on the downlink. The spatially precoded data streams arrive at the UE(s) 910 with different spatial signatures, which enables each of the UE(s) 910 to recover the one or more the data streams destined for that UE 910. On the uplink, each UE 910 may transmit one or more spatially precoded data streams, which enables Node B 908 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 10:
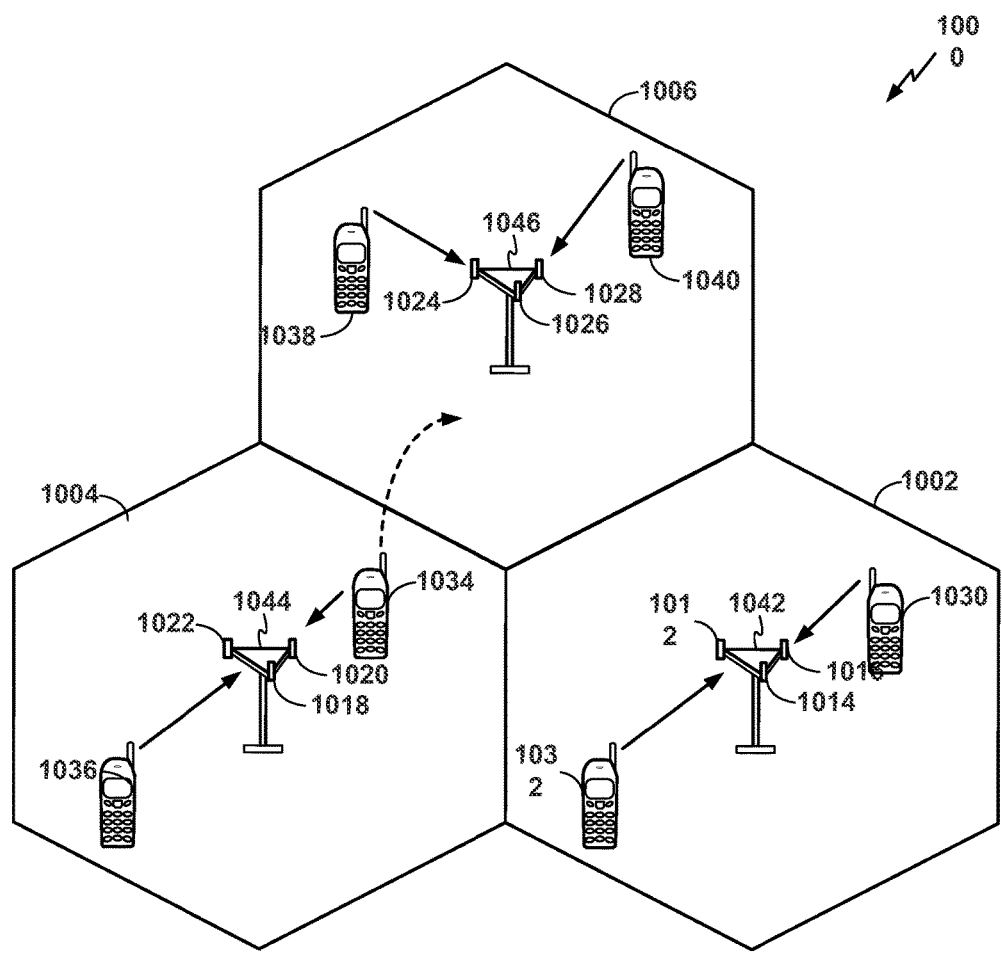
FIG. 10 is a conceptual diagram illustrating an example of an access network.

Referring to FIG. 10, an access network 1000 in a UTRAN architecture is illustrated, and may include one or more UEs configured to include reselection manager 104 (FIG. 1) for improved reselection during mode transitions. The multiple access wireless communication system includes multiple cellular regions (cells), including cells 1002, 1004, and 1006, each of which may include one or more sectors. The multiple sectors can be formed by groups of antennas with each antenna responsible for communication with UEs in a portion of the cell. For example, in cell 1002, antenna groups 1012, 1014, and 1016 may each correspond to a different sector. In cell 1004, antenna groups 10110, 1020, and 1022 each correspond to a different sector. In cell 1006, antenna groups 1024, 1026, and 10210 each correspond to a different sector. UEs, for example, 1030, 1032, etc, may include several wireless communication devices, e.g., User Equipment or UEs, including reselection manager 104 of FIG. 1, which may be in communication with one or more sectors of each cell 1002, 1004 or 1006. For example, UEs 1030 and 1032 may be in communication with NodeB 1042, UEs 1034 and 1036 may be in communication with NodeB 1044, and UEs 10310 and 1040 can be in communication with NodeB 1046. Here, each NodeB 1042, 1044, 1046 is configured to provide an access point to a CN 904 (FIG. 9) for all the UEs 1030, 1032, 1034, 1036, 10310, 1040 in the respective cells 1002, 1004, and 1006, Additionally, each NodeB 1042, 1044, 1046 and UEs 1030, 1032, 1034, 1036, 10310, 1040 may be UE 102 of FIG. 1 and may perform the methods outlined herein.

As the UE 1034 moves from the illustrated location in cell 1004 into cell 1006, a serving cell change (SCC) or handover may occur in which communication with the UE 1034 transitions from the cell 1004, which may be referred to as the source cell, to cell 1006, which may be referred to as the target cell. Management of the handover procedure may take place at the UE 1034, at the Node Bs corresponding to the respective cells, at a radio network controller 906 (FIG. 9), or at another suitable node in the wireless network. For example, during a call with the source cell 1004, or at any other time, the UE 1034 may monitor various parameters of the source cell 1004 as well as various parameters of neighboring cells such as cells 1006 and 1002. Further, depending on the quality of these parameters, the UE 1034 may maintain communication with one or more of the neighboring cells. During this time, the UE 1034 may maintain an Active Set, that is, a list of cells that the UE 1034 is simultaneously connected to (i.e., the UTRA cells that are currently assigning a downlink dedicated physical channel DPCH or fractional downlink dedicated physical channel F-DPCH to the UE 1034 may constitute the Active Set). In any case, UE 1034 may execute reselection manager 104 to perform the reselection operations described herein.

Further, the modulation and multiple access scheme employed by the access network 900 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 1002.11 (Wi-Fi), IEEE 1002.16 (WiMAX), IEEE 1002.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG.

Figure 11:
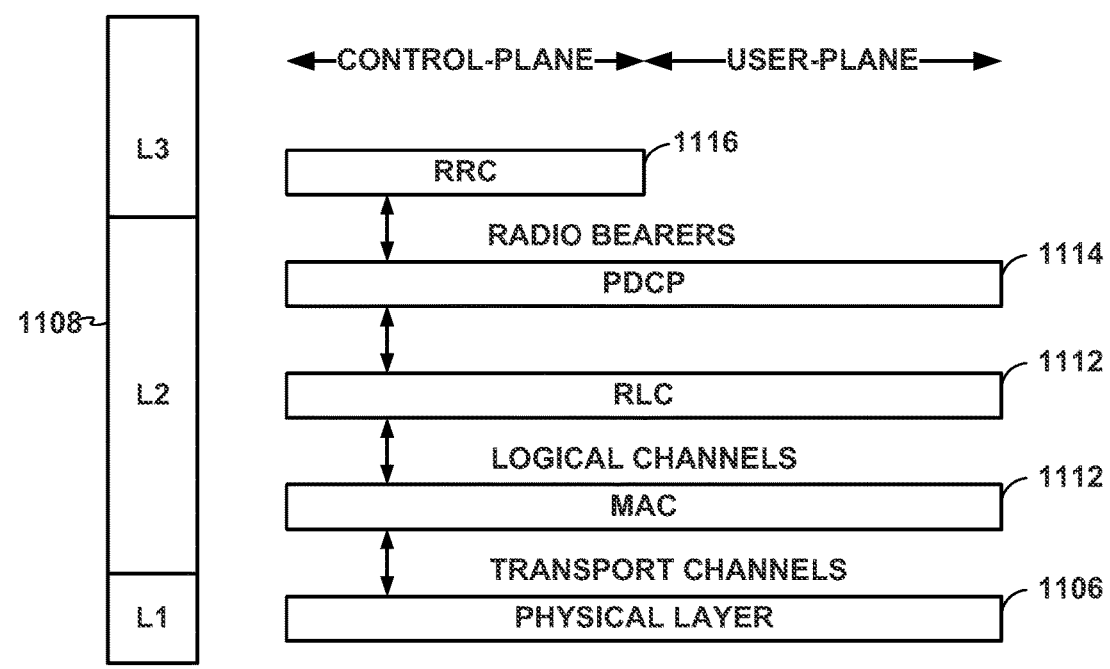
FIG. 11 is a conceptual diagram illustrating an example of a radio protocol architecture for the user and control plane.

11. FIG. 11 is a conceptual diagram illustrating an example of the radio protocol architecture for the user and control planes.

Turning to FIG. 11, the radio protocol architecture for the UE, for example, UE 112 of FIG. 1 configured to include reselection manager 114 (FIG. 1) for improved reselection during mode transitions, and a Node B is shown with three layers: Layer 1, Layer 2, and Layer 3. Layer 1 is the lowest lower and implements various physical layer signal processing functions. Layer 1 will be referred to herein as the physical layer 1106. Layer 2 (L2 layer) 1108 is above the physical layer 1106 and is responsible for the link between the IUE and node B over the physical layer 1106.

In the user plane, the L2 layer 1108 includes a media access control (MAC) sublayer 1110, a radio link control (RLC) sublayer 1112, and a packet data convergence protocol (PDCP) 1114 sublayer, which are terminated at the node B on the network side. Although not shown, the UE may have several upper layers above the L2 layer 1108 including a network layer (e.g., IP layer) that is terminated at a PDN gateway on the network side, and an application layer that is terminated at the other end of the connection (e.g., far end UE, server, etc.).

The PDCP sublayer 1114 provides multiplexing between different radio bearers and logical channels. The PDCP sublayer 1114 also provides header compression for upper layer data packets to reduce radio transmission overhead, security by ciphering the data packets, and handover support for UEs between NodeBs. The RLC sublayer 1112 provides segmentation and reassembly of upper layer data packets, retransmission of lost data packets, and reordering of data packets to compensate for out-of-order reception due to hybrid automatic repeat request (HARQ). The MAC sublayer 1110 provides multiplexing between logical and transport channels. The MAC sublayer 1110 is also responsible for allocating the various radio resources (e.g., resource blocks) in one cell among the UEs. The MAC sublayer 1110 is also responsible for HARQ operations.

Figure 12:
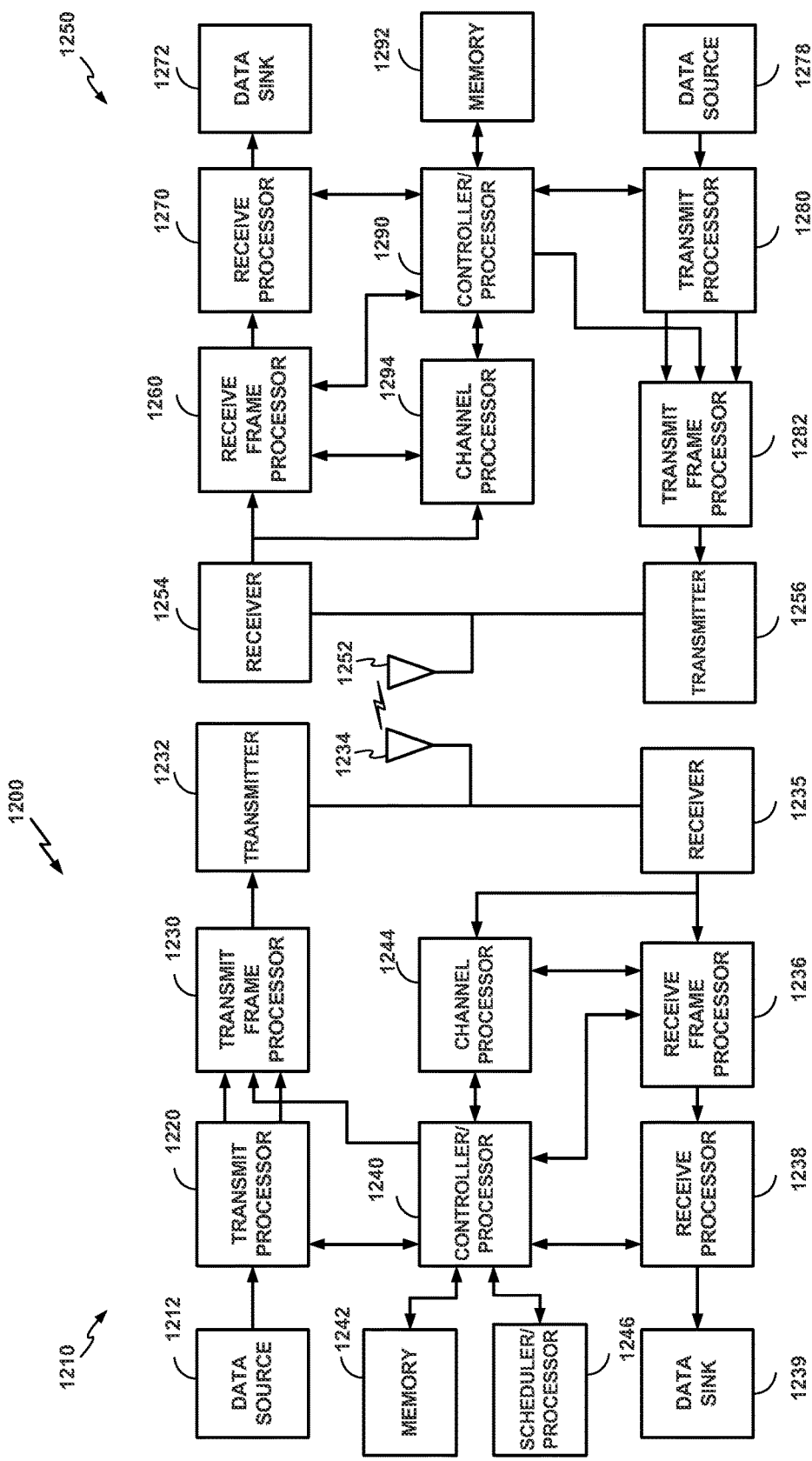
FIG. 12 is a block diagram conceptually illustrating an example of a NodeB in communication with a UE in a telecommunications system.

FIG. 12 is a block diagram of a NodeB 1210 in communication with a UE 1250, where the NodeB 1210 may be source network entity 120 or target network entity 122, and the UE 1250 may be UE 102 of FIG. 1 configured to include reselection manager 104 (FIG. 1) for improved cell reselection during mode transitions. In the downlink communication, a transmit processor 1220 may receive data from a data source 1212 and control signals from a controller/processor 1240. The transmit processor 1220 provides various signal processing functions for the data and control signals, as well as reference signals (e.g., pilot signals). For example, the transmit processor 1220 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1244 may be used by a controller/processor 1240 to determine the coding, modulation, spreading, and/or scrambling schemes for the transmit processor 1220. These channel estimates may be derived from a reference signal transmitted by the UE 1250 or from feedback from the UE 1250. The symbols generated by the transmit processor 1220 are provided to a transmit frame processor 1230 to create a frame structure. The transmit frame processor 1230 creates this frame structure by multiplexing the symbols with information from the controller/processor 1240, resulting in a series of frames. The frames are then provided to a transmitter 1232, which provides various signal conditioning functions including amplifying, filtering, and modulating the frames onto a carrier for downlink transmission over the wireless medium through antenna 1234. The antenna 1234 may include one or more antennas, for example, including beam steering bidirectional adaptive antenna arrays or other similar beam technologies.

At the UE 1250, a receiver 1254 receives the downlink transmission through an antenna 1252 and processes the transmission to recover the information modulated onto the carrier. The information recovered by the receiver 1254 is provided to a receive frame processor 1260, which parses each frame, and provides information from the frames to a channel processor 1294 and the data, control, and reference signals to a receive processor 1270. The receive processor 1270 then performs the inverse of the processing performed by the transmit processor 1220 in the NodeB 1212. More specifically, the receive processor 1270 descrambles and despreads the symbols, and then determines the most likely signal constellation points transmitted by the NodeB 1212 based on the modulation scheme. These soft decisions may be based on channel estimates computed by the channel processor 1294. The soft decisions are then decoded and deinterleaved to recover the data, control, and reference signals. The CRC codes are then checked to determine whether the frames were successfully decoded. The data carried by the successfully decoded frames will then be provided to a data sink 1272, which represents applications running in the UE 1250 and/or various user interfaces (e.g., display). Control signals carried by successfully decoded frames will be provided to a controller/processor 1290. When frames are unsuccessfully decoded by the receiver processor 1270, the controller/processor 1290 may also use an acknowledgement (ACK) and/or negative acknowledgement (NACK) protocol to support retransmission requests for those frames.

In the uplink, data from a data source 1278 and control signals from the controller/processor 1290 are provided to a transmit processor 1280. The data source 1278 may represent applications running in the UE 1250 and various user interfaces (e.g., keyboard). Similar to the functionality described in connection with the downlink transmission by the NodeB 1210, the transmit processor 1280 provides various signal processing functions including CRC codes, coding and interleaving to facilitate FEC, mapping to signal constellations, spreading with OVSFs, and scrambling to produce a series of symbols. Channel estimates, derived by the channel processor 1294 from a reference signal transmitted by the NodeB 1210 or from feedback contained in the midamble transmitted by the NodeB 1210, may be used to select the appropriate coding, modulation, spreading, and/or scrambling schemes. The symbols produced by the transmit processor 1280 will be provided to a transmit frame processor 1282 to create a frame structure. The transmit frame processor 1282 creates this frame structure by multiplexing the symbols with information from the controller/processor 1290, resulting in a series of frames. The frames are then provided to a transmitter 1256, which provides various signal conditioning functions including amplification, filtering, and modulating the frames onto a carrier for uplink transmission over the wireless medium through the antenna 1252.

The uplink transmission is processed at the NodeB 1210 in a manner similar to that described in connection with the receiver function at the UE 1250. A receiver 1235 receives the uplink transmission through the antenna 1234 and processes the transmission to recover the information modulated onto the carrier. The information recovered by the receiver 1235 is provided to a receive frame processor 1236, which parses each frame, and provides information from the frames to the channel processor 1244 and the data, control, and reference signals to a receive processor 1238. The receive processor 1238 performs the inverse of the processing performed by the transmit processor 1280 in the UE 1250. The data and control signals carried by the successfully decoded frames may then be provided to a data sink 1239 and the controller/processor, respectively. If some of the frames were unsuccessfully decoded by the receive processor, the controller/processor 1240 may also use an acknowledgement (ACK) and/or negative acknowledgement (NACK) protocol to support retransmission requests for those frames.

The controller/processors 1240 and 1290 may be used to direct the operation at the NodeB 1210 and the UE 1250, respectively. For example, the controller/processors 1240 and 1290 may provide various functions including timing, peripheral interfaces, voltage regulation, power management, and other control functions. The computer readable media of memories 1242 and 1292 may store data and software for the NodeB 1210 and the UE 1250, respectively. A scheduler/processor 1246 at the NodeB 1210 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims, No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for improved reselection during mode transitions at a user equipment (UE), comprising:

performing, at the UE, inter-radio access technology (IRAT) cell reselection measurements, wherein the IRAT cell reselection measurements are associated with a cell reselection from a first radio access technology (RAT) to a second RAT;
identifying, at the UE, a switching of the UE from an all priority scheduling mode to a high priority scheduling mode or from a high priority scheduling mode to an all priority scheduling mode, wherein the switching is identified while the IRAT cell reselection measurements are in progress, and wherein the switching is based at least on changes in signal quality of a serving cell of the UE or mobility of the UE;
initiating, at the UE, a mode transition timer at the UE in response to the identification, wherein the mode transition timer is set to a value between zero and less than a first value when the UE is switching from the all priority scheduling mode to the high priority scheduling mode or zero and less than a second value when the UE is switching from the high priority scheduling mode to the all priority scheduling mode, and wherein the first value is set to a value of $T_{higher\ priority\ search}$ and the second value is set to a value of $K_{carrier}*T_{detect-UTRA}$ as defined in 3GPP Specifications; and
triggering, at the UE, a search for one or more frequencies of the high priority scheduling mode or one or more frequencies of the all priority scheduling mode upon expiration of the mode transition timer.

2. The method of claim 1, further comprising:
performing a reselection to a frequency of the high priority scheduling mode or the all priority scheduling mode.

3. A user equipment (UE) for improved reselection during mode transitions at the UE, comprising:
means for performing inter-radio access technology (IRAT) cell reselection measurements at the UE, wherein the IRAT cell reselection measurements are associated with a cell reselection from a first radio access technology (RAT) to a second RAT;
means for identifying a switching of the UE from an all priority scheduling mode to a high priority scheduling mode or from a high priority scheduling mode to an all priority scheduling mode, wherein the switching is initiated while the IRAT cell reselection measurements are in progress, and wherein the switching is based at least on changes in signal quality of a serving cell of the UE or mobility of the UE;
means for initiating a mode transition timer at the UE in response to the identification, wherein the mode transition timer is set to a value between zero and less than a first value when the UE is for switching from the all priority scheduling mode to the high priority scheduling mode or zero and less than a second value when the UE is switching from the high priority scheduling mode to the all priority scheduling mode, and wherein the first value is set to a value of $T_{higher\ priority\ search}$ and the second value is set to a value of $K_{carrier}*T_{detect-UTRA}$ as defined in 3GPP Specifications; and
means for triggering a search at the UE for one or more frequencies of the high priority scheduling mode or one or more frequencies of the all priority scheduling mode upon expiration of the mode transition timer.

4. The UE of claim 3, further comprising:
means for performing a reselection to a frequency of the high priority scheduling mode or the all priority scheduling mode.

5. A non-transitory computer readable medium storing computer executable code for improved reselection during mode transitions, comprising:
code for performing inter-radio access technology (IRAT) cell reselection measurements, at the UE, wherein the IRAT cell reselection measurements are associated with a cell reselection from a first radio access technology (RAT) to a second RAT;
ode for identifying a switching of the UE from an all priority scheduling mode to a high priority scheduling mode or from a high priority scheduling mode to an all priority scheduling mode, wherein the switching is initiated while the IRAT cell reselection measurements are in progress, and wherein the switching is based at least on changes in signal quality of a serving cell of the UE or mobility of the UE;
code for initiating a mode transition timer at the UE in response to the identification, wherein the mode transition timer is set to a value between zero and less than a first value when the UE is switching from the all priority scheduling mode to the high priority scheduling mode or zero and less than a second value when the UE is switching from the high priority scheduling mode to the all priority scheduling mode, and wherein the first value is set to a value of $T_{higher\ priority\ search}$ and the second value is set to a value of $K_{carrier}*T_{detect-UTRA}$ as defined in 3GPP Specifications; and
code for triggering a search at the UE for one or more frequencies of the high priority scheduling mode or one or more frequencies of the all priority scheduling mode upon expiration of the mode transition timer.

6. The computer readable medium of claim 5, further comprising:
code for performing a reselection to a frequency of the high priority scheduling mode or the all priority scheduling mode.

7. An user equipment (UE) for improved reselection during mode transitions at the UE, comprising:
a mode switching component to perform inter-radio access technology (IRAT) cell reselection measurements, wherein the IRAT cell reselection measurements are associated with a cell reselection from a first radio access technology (RAT) to a second RAT;
the mode switching component further configured to identify a switching of the UE from an all priority scheduling mode to a high priority scheduling mode or from a high priority scheduling mode to an all priority scheduling mode, wherein the identified is initiated while the IRAT cell reselection measurements are in progress, and wherein the switching is based at least on changes in signal quality of a serving cell of the UE or mobility of the UE;
a mode transition timer initiating component to initiate a mode transition timer in response to the identification, wherein the mode transition timer is set to a value between zero and less than a first value when the UE is switching from the all priority scheduling mode to the high priority scheduling mode or zero and less than a second value when switching from the high priority scheduling mode to the all priority scheduling mode, and wherein the first value is set to a value of $T_{higher\ priority\ search}$ and the second value is set to a value of $K_{carrier}*T_{detect-UTRA}$ as defined in 3GPP Specifications; and
a frequency search triggering component to trigger a search for one or more frequencies of the high priority scheduling mode or one or more frequencies of the all priority scheduling mode upon expiration of the mode transition timer.

8. The UE of claim 7, further comprising:
a reselection component to perform a reselection to a frequency of the high priority scheduling mode or the all priority scheduling mode.

9. The method of claim 1, wherein the first RAT is Wideband Code Division Multiple Access (W-CDMA) and the second RAT is Long Term Evolution (LTE).

10. The UE of claim 3, wherein the first RAT is Wideband Code Division Multiple Access (W-CDMA) and the second RAT is Long Term Evolution (LTE).

11. The computer readable medium of claim 5, wherein the first RAT is Wideband Code Division Multiple Access (W-CDMA) and the second RAT is Long Term Evolution (LTE).

12. The UE of claim 7, wherein the first RAT is Wideband Code Division Multiple Access (W-CDMA) and the second RAT is Long Term Evolution (LTE).

* * * * *